US008638077B2

(12) United States Patent
Saphon et al.

(10) Patent No.: US 8,638,077 B2
(45) Date of Patent: Jan. 28, 2014

(54) METHOD FOR REGULATING AN OUTPUT VOLTAGE OF A PULSED-WIDTH MODULATED SWITCHING CONVERTER

(75) Inventors: Rémy Saphon, Frouzins (FR); Christophe Basso, Pibrac (FR)

(73) Assignee: Semiconductor Components Industries, LLC, Phoenix, AZ (US)

( * ) Notice: Subject to any disclaimer, the term of this patent is extended or adjusted under 35 U.S.C. 154(b) by 324 days.

(21) Appl. No.: 12/918,923

(22) PCT Filed: Apr. 29, 2008

(86) PCT No.: PCT/US2008/061914
§ 371 (c)(1),
(2), (4) Date: Aug. 23, 2010

(87) PCT Pub. No.: WO2009/134249
PCT Pub. Date: Nov. 5, 2009

(65) Prior Publication Data
US 2011/0006745 A1    Jan. 13, 2011

(51) Int. Cl.
*G05F 1/00*    (2006.01)
(52) U.S. Cl.
USPC .......................................... 323/282; 323/271
(58) Field of Classification Search
USPC .................. 323/269–271, 273–275, 282, 303
See application file for complete search history.

(56) References Cited

U.S. PATENT DOCUMENTS

| 6,420,858 | B1 * | 7/2002 | Kitagawa et al. | 323/282 |
| 6,515,463 | B2 | 2/2003 | Ling | |
| 7,129,663 | B2 * | 10/2006 | Suzuki | 318/504 |
| 2002/0145891 | A1 | 10/2002 | Ling | |
| 2003/0178974 | A1 * | 9/2003 | Rozsypal | 323/224 |
| 2004/0183510 | A1 * | 9/2004 | Sutardja et al. | 323/266 |
| 2005/0046405 | A1 * | 3/2005 | Trafton et al. | 323/308 |
| 2005/0057238 | A1 * | 3/2005 | Yoshida | 323/282 |
| 2009/0099704 | A1 * | 4/2009 | Takegami et al. | 700/298 |

OTHER PUBLICATIONS

Maxim Application Note 2031, "DC-DC Converter Tutorial", Oct. 19, 2000, Copyright Maxim Integrated Products, 13 pages.

\* cited by examiner

*Primary Examiner* — Adolf Berhane
*Assistant Examiner* — Emily P Pham
(74) *Attorney, Agent, or Firm* — Rennie William Dover

(57) ABSTRACT

A method for regulating the output voltage of a power supply. A boost PWM switching converter adjusts the gate drive signals to a switching transistor and a pass transistor so that the power supply has an operating frequency, Fs, based on a comparison between a parameter and a reference. The parameter may be a ratio of an input voltage to an output voltage, a difference between the output voltage and the input voltage, or the value of an input voltage. In accordance with the comparison between the parameter and the reference, the switching control circuit linearly decreases the operating frequency of the power supply. By changing the operating frequency, the output and input voltages of the power regulator may be almost equal to each other when operating with a control signal having a low duty cycle while maintaining a low output voltage ripple and a low inductor current ripple.

22 Claims, 3 Drawing Sheets

US 8,638,077 B2

METHOD FOR REGULATING AN OUTPUT VOLTAGE OF A PULSED-WIDTH MODULATED SWITCHING CONVERTER

TECHNICAL FIELD

The present invention relates, in general, to semiconductor components and, more particularly, to power switching semiconductor components.

BACKGROUND

Power converters are used in a variety of electronic products including automotive, aviation, telecommunications, and consumer electronics. Power converters such as Direct Current to Direct Current ("DC-DC") switching converters have become widely used in portable electronic products such as laptop computers, personal digital assistants, pagers, cellular phones, etc. which are typically powered by batteries. DC-DC switching converters, also referred to as switched mode power supplies, are capable of delivering multiple voltages from a single voltage independent of the load current being drawn from the converter or from any changes in the power supply feeding the converter. One type of DC-DC switching converter used in portable electronic applications is a boost converter. This type of converter is capable of switching an input voltage from one voltage level to another voltage level. More particularly, a boost converter switches an input voltage from one voltage level to a higher voltage level. Another type of DC-DC switching converter used in portable electronic applications is a buck converter. This type of converter is capable of switching an input voltage from one voltage level to a lower voltage level.

Typically, a switching converter stores energy in an energy storage element such as an inductor. Two parameters in designing a switching converter are the peak current flowing through the inductor and the inductance value of the inductor. It is desirable to maintain a low peak current while keeping the inductance value small. As those skilled in the art are aware, large currents consume large amounts of power and large value inductors consume area which increases the cost and decreases the efficiency of the switching converter. One technique for maintaining a small inductor value and an acceptably low current is to operate the switching converter at a high switching frequency, $F_S$, e.g., a switching frequency of at least one megaHertz (MHz). A switching DC-DC converter can be operated at a constant high switching frequency, $F_S$, by using pulsed width modulation (PWM) thereby allowing the use of inductors with small inductance values.

Although operating the switching converter at a high switching frequency, $F_S$, allows the use of an inductor with a lower inductance value and a lower peak current flowing through the inductor, it can lead to undesirably short propagation delays. A drawback with a PWM switching converter is that as the duty cycle of the PWM control signal approaches zero, the length of time it takes for a signal to travel from one circuit node to another becomes too long. In other words, the propagation delay between circuit nodes limits the minimum duty cycle for a given frequency, $F_S$, and a given technology. When the duty cycle becomes too small, the PWM switching converter seeks another way to accomplish regulation such as by skipping some cycles which causes burst regulation. This results in an unacceptably high ripple on the output voltage and in the current through the inductor for medium and heavy loads. There may also be the appearance of electromagnetic interference at frequencies lower than the switching frequency $F_S$.

Accordingly, it would be advantageous to have a method for regulating an output voltage of a PWM mode switching converter as the duty cycle of its operating frequency approaches zero. It would be of further advantage for the method to be time and cost efficient to implement.

BRIEF DESCRIPTION OF THE DRAWINGS

The present invention will be better understood from a reading of the following detailed description, taken in conjunction with the accompanying drawing figures, in which like reference characters designate like elements and in which.

DETAILED DESCRIPTION

Generally, the present invention provides a method for regulating an output voltage of a converter system such as, for example a PWM switching DC-DC converter. In accordance with an embodiment of the present invention, a plurality of electrical signals are provided wherein one of the electrical signals has a frequency $F_S$. The frequency $F_S$ is changed from one frequency to another frequency in response to a comparison with a reference signal.

In accordance with another embodiment of the present invention, a portion of a converter system is operated at a first frequency. Operation at the first frequency is continued in response to a comparison between a parameter and a first reference. The operating frequency of the converter system is changed to a second frequency in response to a comparison between the parameter and a second reference.

Figure 1:
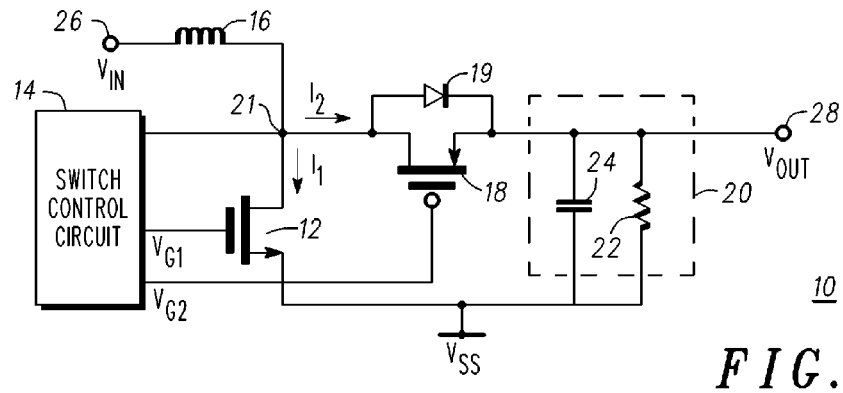
FIG. 1 is a circuit diagram of a PWM switching DC-DC converter operating in a synchronous boost conversion mode in accordance with an embodiment of the present invention.

FIG. 1 is a circuit diagram of a PWM switching DC-DC converter 10 operating in a synchronous boost conversion mode in accordance with an embodiment of the present invention. What is shown in FIG. 1 is a switch 12 having a control electrode coupled to a switch control circuit 14, a current carrying electrode coupled for receiving a source of operating potential such as, for example, $V_{SS}$, and a current carrying electrode coupled for receiving an input signal through an energy storage element 16 and coupled to a load 20 through a transistor 18. By way of example, switch 12 is an N-channel switching transistor, transistor 18 is a P-channel pass transistor, energy storage element 16 is an inductor, and load 20 comprises a load resistance 22 coupled in a parallel configuration to a load capacitance 24. More particularly, switching transistor 12 has a gate or control electrode connected to switch control circuit 14, a source coupled for receiving the source of operating potential $V_{SS}$, and a drain coupled for receiving input signal $V_{IN}$, through inductor 16 and to a drain of pass transistor 18. Pass transistor 18 has a gate connected to switch control circuit 14, a drain commonly connected to the drain of switching transistor 12 and to one terminal of inductor 16, and a source commonly connected to a terminal of load resistance 22 and load capacitance 24. The drains of switching transistor 12 and pass transistor 18 and the terminal of inductor 16 that are commonly connected form a node 21. Optionally switch control circuit 14 may have an input coupled to node 21 for sensing the inductor current. The commonly connected source of pass transistor 18 and the terminals of load resistance 22 and load capacitance 24 that are commonly connected form an output terminal 28 at which an output signal appears. The other terminals of load resistance 22 and load capacitance 24 are coupled for receiving source of operating potential $V_{SS}$. By way of example the input signal is an electrical signal such as a voltage signal $V_{IN}$, and the output signal is an electrical signal such as an output voltage $V_{OUT}$.

In operation, synchronous PWM switching DC-DC converter 10 regulates the voltage present at output terminal 28 to a level predetermined by switch control circuit 14. Switch control circuit 14 provides logic signals $V_{G1}$ and $V_{G2}$ to the gate terminals of switching transistor 12 and pass transistor 20, respectively, which independently control current $I_2$ to charge capacitor 24 to the regulated voltage $V_{OUT}$. It should be noted that logic signals $V_{G1}$, and $V_{G2}$ may be referred to as electrical signals.

In accordance with an embodiment of the present invention, during a time $T_1$ switch control circuit 14 generates gate drive signals $V_{G1}$ and $V_{G2}$, wherein gate drive signal $V_{G1}$ renders switching transistor 12 conductive and gate drive signal $V_{G2}$ renders pass transistor 18 non-conductive. Activating switching transistor 12 causes a current $I_1$ to flow and the storage of magnetic energy by inductor 16. The voltage at node 21 is substantially set to voltage $V_{SS}$, when switching transistor 12 is conductive. When source of operating potential $V_{SS}$, is at ground potential, the voltage at node 21 is substantially set to ground potential. At a time $T_2$, switch control circuit 14 provides gate drive signals $V_{G1}$ and $V_{G2}$ to the gates of switching transistor 12 and pass transistor 18, respectively, rendering switching transistor 12 non-conductive and pass transistor 18 conductive. When switching transistor 12 is in a non-conductive state, the current flowing through inductor 16 cannot change instantaneously, thus inductor 16 changes the voltage at node 21 until forward body diode 19 of transistor 18 becomes conductive. The voltage at node 21 equals the sum of output voltage $V_{OUT}$, and about 0.7 volts, i.e., $V_{OUT}$+0.7 volts. Current flows from input terminal 26 to output terminal 28 through inductor 16 and body diode 19 of pass transistor 18. Pass transistor 18 is then rendered conductive by gate drive signals $V_{G1}$, and $V_{G2}$ to provide a less resistive current path. A feature of switch control circuit 14 is its ability to synchronously control the conductivity of switching transistor 12 and pass transistor 18. Thus the conductive state of switching transistor 12 can be mutually exclusive of the conductive state of pass transistor 18 such that switching transistor 12 and pass transistor 18 are not simultaneously conductive.

Figure 2:
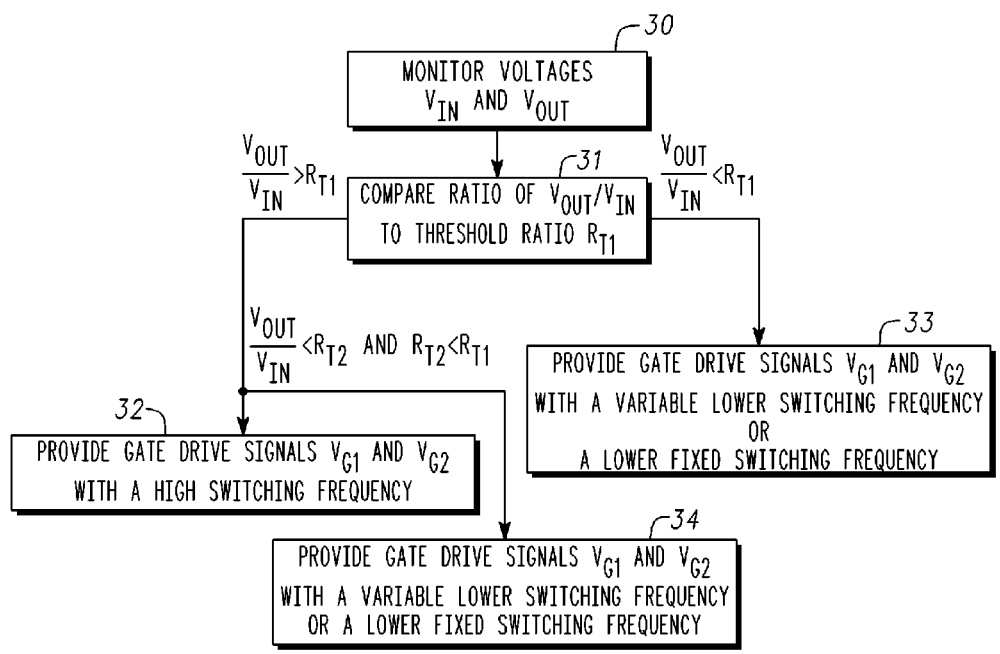
FIG. 2 is a flow chart illustrating the generation of switching signals in accordance with an embodiment of the present invention.

Referring to FIGS. 1 and 2, switching control circuit 14 generates gate drive signals $V_{G1}$ and $V_{G2}$ so that each gate drive signal has a frequency $F_S$. In addition to generating gate drive signals $V_{G1}$ and $V_{G2}$, switching control circuit 14 monitors input voltage $V_{IN}$ appearing on input terminal 26 and output voltage $V_{OUT}$ appearing at output terminal 28 (box 30 of FIG. 2) and adjusts frequency $F_S$ to be a nominal value or to be a variable lower value or a fixed value lower than the nominal value. In accordance with one embodiment of the present invention, switching control circuit 14 adjusts gate drive signals $V_{G1}$ and $V_{G2}$ to have a frequency $F_S$ based on the ratio of voltages $V_{OUT}$ to $V_{IN}$ (i.e., $V_{OUT}/V_{IN}$). More particularly, switching control circuit 14 provides gate drive signals $V_{G1}$ and $V_{G2}$ with a nominal high switching frequency $F_S$ for gate drive signals $V_{G1}$ and $V_{G2}$ when the ratio $V_{OUT}/V_{IN}$ is above a threshold ratio $R_{T1}$ (boxes 31 and 32 of FIG. 2), it provides gate drive signals $V_{G1}$ and $V_{G2}$ with a variable lower frequency $F_S$ when the ratio $V_{OUT}/V_{IN}$ is below a threshold ratio $R_{T1}$ (boxes 32 and 33 of FIG. 2), and it provides gate drive signals $V_{G1}$ and $V_{G2}$ with a lower fixed frequency $F_S$ when the ratio $V_{OUT}/V_{IN}$ is below reference threshold ratio $R_{T1}$. In response to the ratio $V_{OUT}/V_{IN}$, PWM switching DC-DC converter 10 preferably changes switching frequency $F_S$ linearly or in a linear fashion. By way of example, the nominal higher frequency for frequency $F_S$ is about 2 MHz, the nominal lower frequency for $F_S$ is about 1 MHz, and reference threshold ratio $R_{T1}$ is equal to about 1.11, i.e., the ratio of $V_{OUT}/V_{IN}$ when $V_{OUT}$ equals about 1 volt and $V_{IN}$ equals about 0.9 volts.

Alternatively, switching control circuit 14 provides gate drive signals $V_{G1}$ and $V_{G2}$ with a nominal high switching frequency $F_S$ for gate drive signals $V_{G1}$ and $V_{G2}$ when the ratio $V_{OUT}/V_{IN}$ is above a threshold ratio $R_{T1}$ (boxes 31 and 32 of FIG. 2), it provides gate drive signals $V_{G1}$ and $V_{G2}$ with a variable lower frequency $F_S$ when the ratio $V_{OUT}/V_{IN}$ is below a threshold ratio $R_{T2}$ (boxes 31 and 33 of FIG. 2), and it provides gate drive signals $V_{G1}$ and $V_{G2}$ with a lower fixed frequency $F_S$ when the ratio $V_{OUT}/V_{IN}$ is below reference threshold ratio $R_{T2}$, where the reference threshold ratio $R_{T2}$ is less than the reference threshold ratio $R_{T1}$ (boxes 31 and 34 of FIG. 2). In response to the ratio $V_{OUT}/V_{IN}$, PWM switching DC-DC converter 10 preferably linearly changes switching frequency $F_S$.

Figure 3:
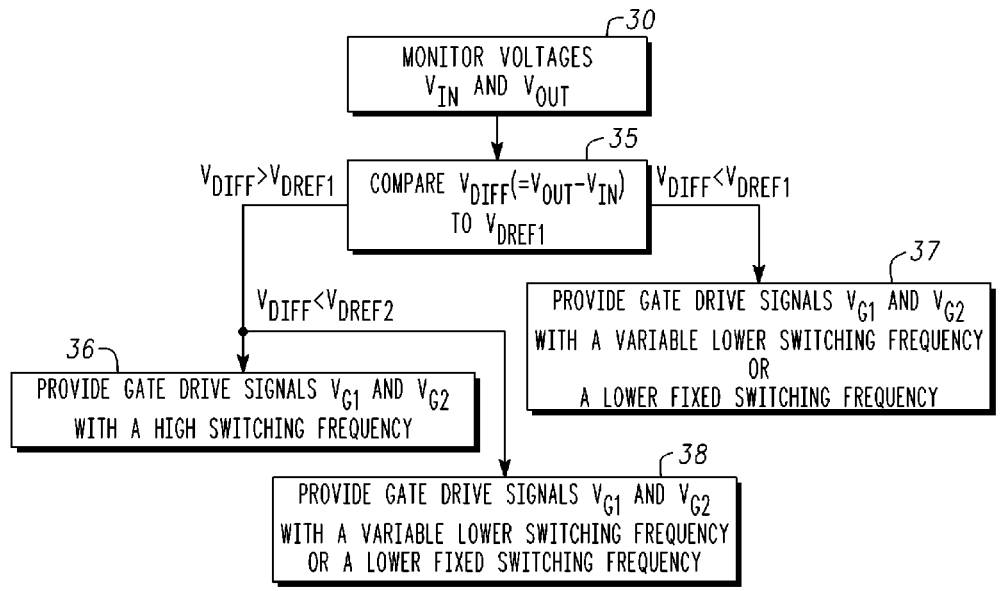
FIG. 3 is a flow chart illustrating the generation of switching signals in accordance with an embodiment of the present invention.

In accordance with another embodiment of the present invention, switching control circuit 14 adjusts gate drive signals $V_{G1}$ and $V_{G2}$ to have a frequency $F_S$ based on the difference between voltages $V_{OUT}$ and $V_{IN}$ (i.e., $V_{OUT}-V_{IN}$), where the difference in voltage is referred to as a difference voltage $V_{DIFF}$. More particularly, switching control circuit 14 provides gate drive signals $V_{G1}$ and $V_{G2}$ with a nominal high switching frequency $F_S$ when the difference voltage, $V_{OUT}-V_{IN}$, is greater than or above a difference reference voltage $V_{DREF1}$ (boxes 35 and 36 of FIG. 3), it provides gate drive signals $V_{G1}$ and $V_{G2}$ with a variable lower frequency $F_S$ when the difference voltage is less than or below a difference reference voltage $V_{DREF1}$ (boxes 35 and 37 of FIG. 3), and it provides gate drive signals $V_{G1}$ and $V_{G2}$ with a lower fixed frequency $F_S$ when the difference voltage is less than or below difference reference voltage $V_{DREF1}$. In response to difference voltage $V_{DIFF}$, PWM switching DC-DC converter 10 preferably linearly changes switching frequency $F_S$. By way of example, the nominal higher frequency for frequency $F_S$ is about 2 MHz, the nominal lower frequency for frequency $F_S$ is about 1 MHz, and reference voltage $V_{DREF1}$ equals about one volt for an output voltage $V_{OUT}$ equal to about five volts.

Alternatively, switching control circuit 14 provides gate drive signals $V_{G1}$ and $V_{G2}$ with a nominal high switching frequency $F_S$ when the difference voltage, $V_{OUT}-V_{IN}$, is greater than or above a difference reference voltage $V_{DREF1}$ (boxes 35 and 36 of FIG. 3), it provides gate drive signals $V_{G1}$ and $V_{G2}$ with a variable lower frequency $F_S$ when the difference voltage is less than or below a difference reference voltage $V_{DREF2}$ (boxes 35 and 37 of FIG. 3), and it provides gate drive signals $V_{G1}$ and $V_{G2}$ with a lower fixed frequency $F_S$ when the difference voltage is less than or below a difference reference Voltage $V_{DREF2}$. In response to difference voltage $V_{DIFF}$, PWM switching DC-DC converter 10 preferably linearly changes switching frequency $F_S$.

In accordance with another embodiment of the present invention, switching control circuit 14 adjusts gate drive signals $V_{G1}$ and $V_{G2}$ to have a frequency $F_S$ based on the value of input voltage $V_{IN}$. More particularly, switching control circuit 14 provides gate drive signals $V_{G1}$ and $V_{G2}$ with a nominal high switching frequency $F_S$ when input voltage $V_{IN}$ is less than or below a threshold voltage $V_{TH1}$ (boxes 40 and 41 of FIG. 4), it provides gate drive signals $V_{G1}$ and $V_{G2}$ with a variable lower frequency $F_S$ when input voltage $V_{IN}$ is greater than or above threshold voltage $V_{TH1}$ (boxes 40 and 42 of FIG. 4), and it provides gate drive signals $V_{G1}$ and $V_{G2}$ with a lower fixed frequency $F_S$ when input voltage $V_{IN}$ is greater than or above threshold voltage $V_{TH1}$. In response to input voltage $V_{IN}$, PWM switching DC-DC converter 10 preferably linearly changes switching frequency $F_S$. By way of example, the nominal higher frequency for frequency $F_S$ is about 2 MHz, the nominal lower frequency for frequency $F_S$ is about 1 MHz and threshold voltage $V_{TH1}$ equals about four volts for an output voltage $V_{OUT}$ equal to about five volts. In response to input voltage $V_{IN}$, PWM switching DC-DC converter 10 preferably linearly changes switching frequency $F_S$.

Figure 4:
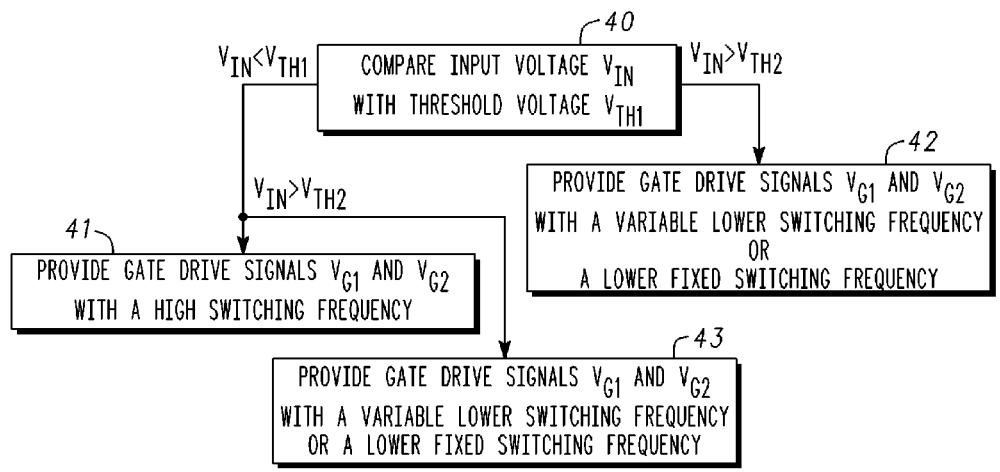
FIG. 4 is a flow chart illustrating the generation of switching signals in accordance with an embodiment of the present invention.

More particularly, switching control circuit 14 provides gate drive signals $V_{G1}$ and $V_{G2}$ with a nominal high switching frequency $F_S$ when input voltage $V_{IN}$ is less than or below a threshold voltage $V_{TH1}$ (boxes 40 and 41 of FIG. 4), it provides gate drive signals $V_{G1}$ and $V_{G2}$ with a variable lower frequency $F_S$ when input voltage $V_{IN}$ is greater than or above threshold voltage $V_{TH2}$ (boxes 40 and 42 of FIG. 4), and it provides gate drive signals $V_{G1}$ and $V_{G2}$ with a lower fixed frequency $F_S$ when input voltage $V_{IN}$ is greater than or above threshold voltage $V_{TH2}$ (boxes 40 and 43 of FIG. 4). In response to input voltage $V_{IN}$, PWM switching DC-DC converter 10 preferably linearly changes switching frequency $F_S$.

Figure 5:
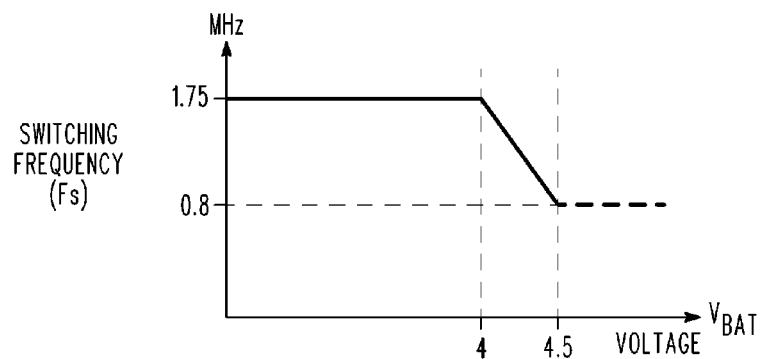
FIG. 5 is a plot of operating frequency versus input voltage of the PWM switching DC-DC converter that linearly changes the frequency of gate drive signals from a nominal operating frequency to a lower operating frequency.

In accordance with embodiments of the present invention, switching control circuit 14 changes frequency $F_S$ from the nominal operating frequency to the lower frequency or the lower variable frequency in a linear fashion. FIG. 5 illustrates an implementation in which switching control circuit 14 linearly changes the frequency of gate drive signals $V_{G1}$ and $V_{G2}$ from a nominal operating frequency of about 1.75 MHz to a lower operating frequency of about 800 kHz. It should be noted that switching control circuit 14 changes frequency $F_S$ when the input voltage approaches the output voltage. FIG. 5 shows switching control circuit 14 beginning to change frequency $F_S$ when the input voltage exceeds about 4 volts and continues changing frequency $F_S$ until the input voltage becomes about 4.5 volts. The output voltage is about the 4.6 volts.

Figure 6:
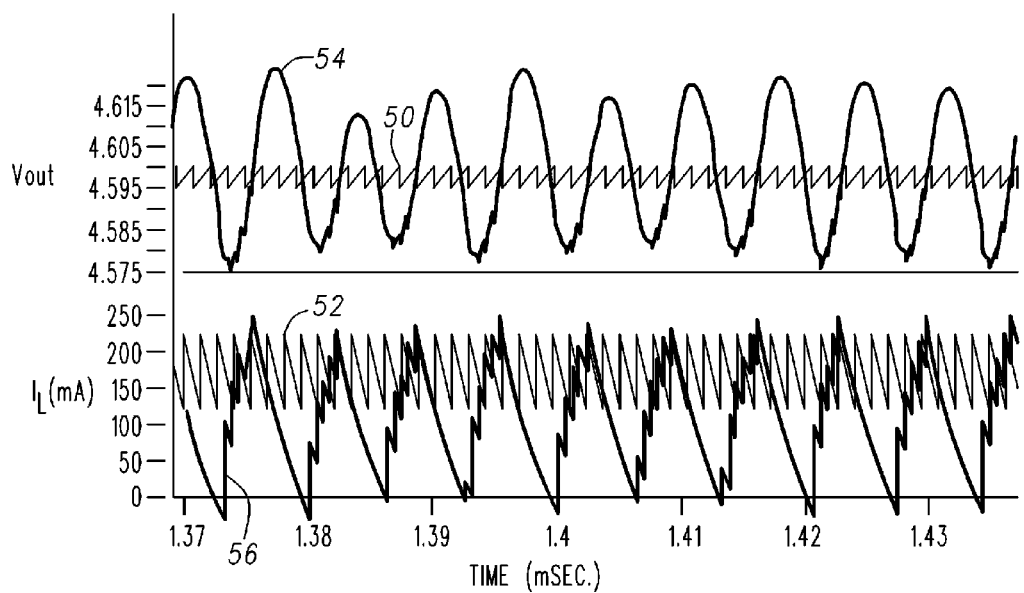
FIG. 6 is a timing diagram illustrating output voltage and inductor current of the PWM switching DC-DC converter as a function of time.

FIG. 6 is a timing diagram illustrating output voltage $V_{OUT}$ and inductor current $I_L$ as a function of time. Output voltage waveform 50 and inductor current waveform 52 are generated when input voltage $V_{IN}$ is about 4.4 volts, output voltage $V_{OUT}$ is about 4.6 volts and frequency $F_S$ is lowered to about 800 kHz. For the sake of comparison, output voltage waveform 54 and inductor current waveform 56 result when voltage $V_{IN}$ is about 4.4 volts, output voltage $V_{OUT}$ is about 4.6 volts and frequency $F_S$ is maintained at 1.75 MHz. Under these conditions, the regulation of output voltage $V_{OUT}$ and inductor current $I_L$ are improved. Thus, lowering frequency $F_S$ when input voltage $V_{IN}$ approaches output voltage $V_{OUT}$ improves regulation of the output voltage and the inductor current in terms of voltage ripple, current ripple, and in terms of sub-harmonic electromagnetic emission.

By now it should be appreciated that a method for regulating the output voltage of a power supply has been provided. In accordance with an embodiment of the present invention, a portion of a converter system is operated at one frequency in response to a comparison between a parameter and a first reference and at a lower frequency in response to a comparison between the parameter and a second reference. The parameter may be an input voltage, a ratio of the output voltage to an input voltage, or a difference between an output voltage and an input voltage. Lowering the operating frequency in accordance with the comparison between the parameter and the reference allows operating power supplies having input voltages that are very close to the output voltage, e.g., within about 100 millivolts. Another advantage is that a small inductance value inductor may be still used when the switching frequency, $F_S$, is reduced because a high input voltage is typically used when the switching frequency $F_S$ is reduced. However, the high input voltage is a limiting factor for peak inductor current. Using a smaller value inductor allows reducing the switching frequency without substantially degrading the peak inductor current. The use of small inductors also decreases the cost of the power supply because a small inductor occupies less silicon area. Operating a power supply having a synchronous architecture in accordance with various embodiments of the present invention also allows the removal of a true cut-off device and improves efficiency. In addition, power supplies operated in accordance with embodiments of the present invention improves control of electromagnetic interference which is advantageous in portable communications applications. Operation of the power supply in accordance with embodiments of the present invention is also suitable for power supplies having an asynchronous architecture.

Although certain preferred embodiments and methods have been disclosed herein, it will be apparent from the foregoing disclosure to those skilled in the art that variations and modifications of such embodiments and methods may be made without departing from the spirit and scope of the invention. It is intended that the invention shall be limited only to the extent required by the appended claims and the rules and principles of applicable law.

What is claimed is:

1. A method for regulating an output voltage of a pulsed-width modulated switching converter, comprising:
    providing first and second transistors, the first transistor having a drain, a source, and a gate, the second transistor having a drain, a source, and a gate, the drains of the first and second transistors connected together and decoupled from the gates of the first and second transistors, and the source of the second transistor coupled to an output terminal;
    providing an input signal, the input signal coupled to the drains of the first and second transistors through an energy storage element;
    providing a drive signal having a first frequency to one of the control electrodes of the first or second transistor; and
    changing the first frequency of the drive signal to a second frequency in response to a comparison of a first parameter with a first reference, the second frequency lower than the first frequency.

2. The method of claim 1, wherein providing the drive signal having the first frequency includes providing the first frequency in response to the first parameter being less than the first reference, wherein the first parameter comprises the input signal.

3. The method of claim 2, wherein changing the first frequency of the drive signal includes changing the first frequency of the drive signal to the second frequency in response to the first parameter being greater than the first reference, wherein the first parameter comprises the input signal.

4. The method of claim 3, wherein changing the first frequency of the drive signal includes linearly changing the first frequency of the drive signal to the second frequency.

5. The method of claim 4, wherein the input signal is an input voltage signal.

6. The method of claim 2, wherein changing the first frequency of the drive signal includes changing the first frequency of the drive signal to the second frequency in response to the input signal being greater than a second reference.

7. The method of claim 1, wherein providing the drive signal having the first frequency includes providing the first frequency in response to the first parameter being greater than the first reference, wherein the first parameter comprises a difference between the output signal and the input signal.

8. The method of claim 7, wherein changing the first frequency of the drive signal includes changing the first frequency of the drive signal to the second frequency in response to the first parameter being less than the first reference, wherein the first parameter comprises a difference between the output signal and the input signal.

9. The method of claim 8, wherein changing the first frequency of the drive signal includes linearly changing the first frequency of the drive signal to the second frequency.

10. The method of claim 7, wherein changing the first frequency of the drive signal includes changing the first frequency of the drive signal to the second frequency in response to the difference between the output signal and the input signal being less than a second reference.

11. The method of claim 1, wherein providing the drive signal having the first frequency includes providing the first frequency in response to a ratio of the output signal to the input signal being greater than the first reference.

12. The method of claim 11, wherein changing the first frequency of the drive signal includes changing the first frequency of the drive signal to the second frequency in response to the ratio of the output signal to the input signal being less than the first reference.

13. The method of claim 12, wherein changing the first frequency of the drive signal includes linearly changing the first frequency of the drive signal to the second frequency.

14. The method of claim 11, wherein changing the first frequency of the drive signal includes changing the first frequency of the drive signal to the second frequency in response to the ratio of the output signal to the input signal being less than a second reference.

15. The method of claim 1, wherein the second frequency is one of a fixed frequency or a variable frequency.

16. A method for regulating an output voltage of a PWM switching converter, comprising:
providing first and second transistors, the first transistor having first and second current carrying electrodes and a control electrode, the second transistor having first and second current carrying electrodes and a control electrode, the first current carrying electrodes of the first and second transistors connected together to form a node and decoupled from the control electrodes of the first and second transistors and the second current carrying electrode of the second transistor coupled to an output terminal;
providing a switch control circuit having an input and first and second outputs, the input of the switch control circuit coupled to the node, the first output coupled to the gate of the first transistor, and the second output coupled to the gate of the second transistor;
providing an input signal, the input signal coupled to the first current carrying electrodes of the first and second transistors through an energy storage element;
monitoring a first signal coupled to the first current carrying electrodes of the first and second transistors through an energy storage element, a second signal appearing at the second terminal of the second transistor, and a current in the energy storage element;
operating the PWM switching converter at a first frequency in response to a parameter that is determined by the first signal and the second signal;
continuing operation of the PWM switching converter at the first frequency in response to a parameter being greater than a first reference; and
operating the PWM switching converter at a second frequency in response to the parameter being less than the first reference, wherein the second frequency is less than the first frequency.

17. The method of claim 16, wherein the parameter is a ratio of an output voltage of the PWM switching converter to an input voltage of the PWM switching converter.

18. The method of claim 16, wherein the parameter is a difference between an output voltage of the switching converter to an input voltage of the PWM switching converter.

19. The method of claim 16, wherein the second frequency is one of a constant frequency or a variable frequency.

20. The method of claim 16, wherein operating the PWM switching converter at a second frequency in response to the parameter being less than the first reference, further includes operating the PWM switching converter at the second frequency in response to the parameter being less than a second reference that is less than the first reference.

21. A method for regulating an output voltage of a PWM switching converter, comprising:
providing first and second transistors, the first transistor having first and second current carrying electrodes and a control electrode, the second transistor having first and second current carrying electrodes and a control electrode, the first current carrying electrodes of the first and second transistors connected together to form a node and decoupled from the control electrodes of the first and second transistors and the second current carrying electrode of the second transistor coupled to an output terminal;
providing an input signal, the input signal coupled to the first current carrying electrodes of the first and second transistors through an energy storage element;
monitoring a current of the energy storage element at the node;
operating the PWM switching converter at a first frequency in response to a parameter that is determined by the input signal and the output signal;
continuing operation of the PWM switching converter at the first frequency in response to a parameter being less than a first reference; and
operating the PWM switching converter at a second frequency in response to the parameter being greater than the first reference, wherein the second frequency is less than the first frequency.

22. The method of claim 21, wherein the parameter is an input voltage of the PWM switching converter.

* * * * *